INVENTORS:
RENATO DI PASQUALE
OTTO C. WAGNER
BY
Karl J. Ross
AGENT.

April 9, 1968     O. C. WAGNER ET AL     3,377,201
SPIRAL BATTERY CELL
Filed March 24, 1964     4 Sheets-Sheet 2
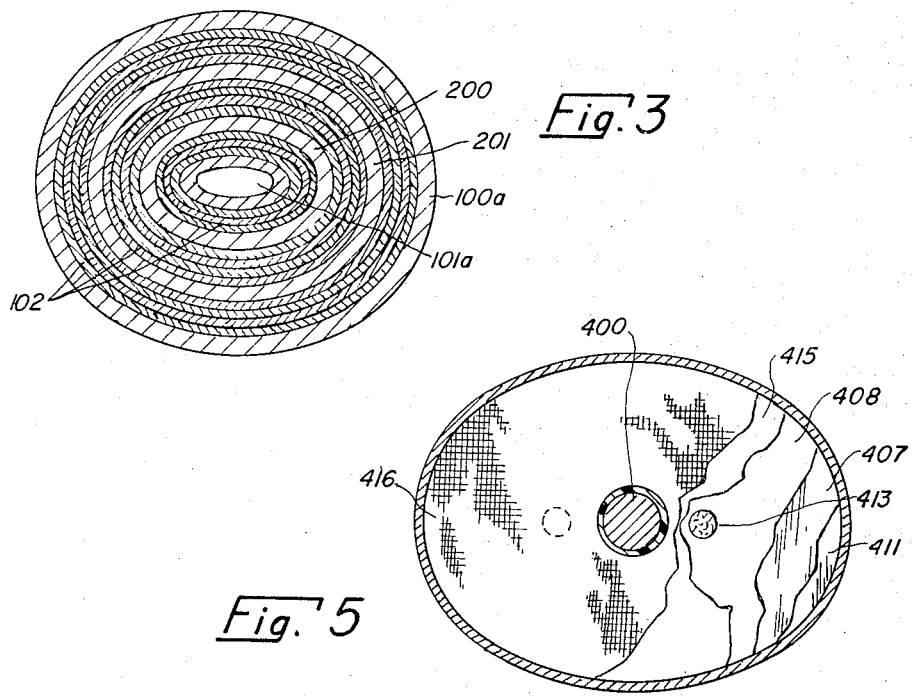
Fig. 3
Fig. 5
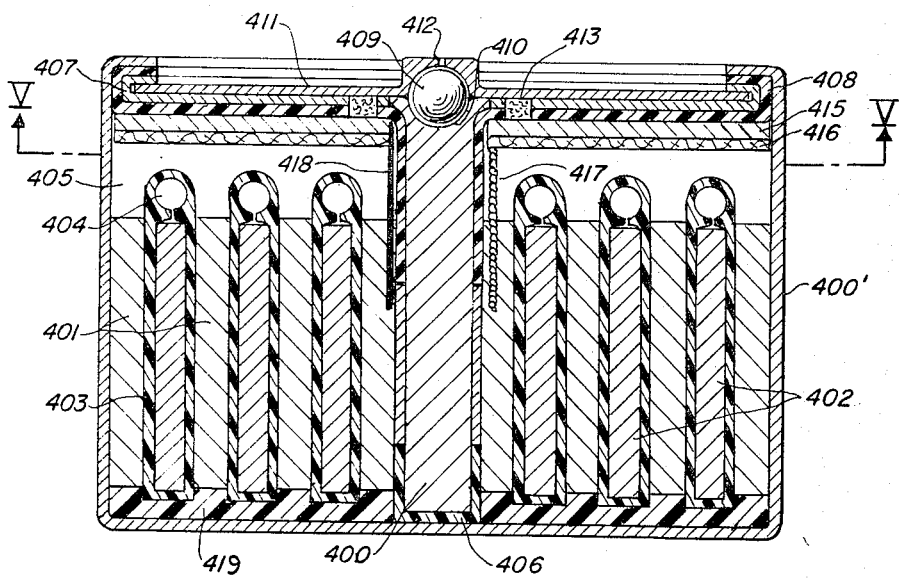
Fig. 4
INVENTORS:
RENATO DI PASQUALE
OTTO WAGNER
BY
Karl G. Ross
AGENT.

April 9, 1968     O. C. WAGNER ET AL     3,377,201
SPIRAL BATTERY CELL

Filed March 24, 1964     4 Sheets-Sheet 3

INVENTORS:
RENATO DI PASQUALE
OTTO WAGNER
BY
*Karl F. Ross*
AGENT

April 9, 1968     O. C. WAGNER ET AL     3,377,201
SPIRAL BATTERY CELL

Filed March 24, 1964     4 Sheets-Sheet 4

INVENTORS:
RENATO DI PASQUALE
OTTO C. WAGNER

BY *Karl F. Ross*
AGENT.

3,377,201
SPIRAL BATTERY CELL
Otto C. Wagner, Bronx, N.Y., and Renato Di Pasquale, Rutherford, N.J., assignors to Yardney International Corp., New York, N.Y.
Filed Mar. 24, 1964, Ser. No. 354,261
5 Claims. (Cl. 136—13)

Our present invention relates to an improved electrochemical battery cell and, more particularly, to a compact high-energy cell construction which is adapted to be hermetically sealed and yet is capable of repeated charging and discharging with reduced capacity loss as compared with earlier cells.

It is a phenomenon of battery cells using liquid electrolyte, which may be free or substantially completely absorbed by interelectrode separators, that repeated cycling (i.e. charging and discharging) results in capacity loss due to electrode-shape changes, densification of the active material on one or both of the electrodes of opposite polarity, penetration by active metals through the interelectrode separators, loss of electrolyte as a consequence of dissociation thereof into gases, and mechanical deterioration of the electrodes along their edges. While these phenomena are observed to a large extent in so-called silver-zinc cells, similar phenomena are also noted in most other alkaline-electrolyte cells and even in lead-acid batteries. The following comments are, therefore, pertinent to the silver oxide/zinc battery cells mentioned above as well as silver oxide/cadmium, nickel oxide/zinc, nickel oxide/cadmium, lead acid, manganese dioxide/zinc and mercuric oxide/zinc battery cells and all others wherein the disadvantages described above are observed.

Referring more specifically to rechargeable silver oxide/zinc batteries, it has been observed that losses of about 50% of the original capacity of such batteries occur after the battery has been subjected to 50-150 charge/discharge cycles. To a large measure, this capacity loss has been attributed to a phenomenon termed "zinc shape changes" whereby the zinc/zinc oxide electrodes loses approximates half of their original effective surface area. This loss of surface area is accompanied by a measurable doubling of the density of the active material of the zinc electrode. Moreover, in silver oxide/zinc battery cells and the others mentioned above, mechanical deterioration of the electrodes is noted to occur to the largest extent along the edges of the electrode plates and, since these plates are generally of rectangular configuration, the ratio of each length to surface area is relatively large. Moreover, when rectangular plates are employed, they are frequently disposed in an upright condition so that the height of the electrolyte column is considerable. When liquid electrolytes are used, whether they be free within the cell casing or absorbed to a large extent by separators, the density of the electrolyte is found to have a gradient of values ranging from a low specific gravity at the upper portion of the seal and high specific gravity at the bottom. Thus along the vertical length of a conventional electrode plate, the availability of electrolyte to sustain the electrode reaction as well as the resistance of the electrolyte path between two juxtaposed electrodes is different. A non uniform charging and discharging of the plates, which may derive from the gravitational effect upon the specific gravity, has, therefore, been postulated.

Another problem arising with battery cells of the character described is the inability to effectively seal them as a consequence of the development of gases during high-rate charging and discharging and overcharging of one or both electrodes. It has been proposed heretofore to provide so-called gas-recombining electrodes in battery cells in which gassing was a problem. Such electrodes have, for the most part, been disposed in the electrode pack or juxtaposed within the main or primary electrode and served to promote both the chemical and electrochemical removal of gases at the three-phase interface between the ambient gases, and liquid electrolyte and the recombining electrode. Auxiliary electrodes of this character have not, heretofore, been able to gain widespread acceptance in the case of many battery structures because of the difficulty of constituting them as part of the cell pack.

It is the principal object of the present invention, therefore, to provide a high-energy battery cell capable of sustaining greater cycling than heretofore possible with maintenance of battery capacity.

A further object of this invention is to provide an improved hermetically sealed cell of this character.

Yet another object of this invention is to provide an improved inter-electrode separator for high-energy batteries.

The foregoing objects and others which will become apparent hereinafter, are attained, in accordance with the present invention, through the provision of a battery cell which comprises a preferably cup-shaped housing, adapted to surround a conductive or partly conductive core with peripheral clearance to form an electrode chamber, and at least one electrode assembly or pack disposed in this chamber and annularly or circumferentially surrounding this core. The electrode pack includes at least two electrodes of opposite polarity, one of which is electrically connected to the core serving as one terminal of the battery while the other can be connected to terminal means such as the conductive housing shell. The foil-like electrode which, together with the interelectrode separator means, are wound about the core, are thus highly elongated and have the narrow width extending in the vertical direction, parallel to the core.

The low height of the cell markedly reduces any effect of electrolyte stratification while the low edge-to-surface ratio of the electrodes reduces the relative deterioration of the electrodes with respect to electrode capacity. Moreover, densification of the active material is found to be markedly reduced as is shedding or creeping of the electrode material, the electrolyte being confined within a very restricted volume.

According to a more specific feature of the present invention, one or more electrode packs are spirally wound about the core with electrodes of corresponding polarity secured to the core at angularly spaced locations and preferably in a tangential manner. Thus it is contemplated, in accordance with the present invention, that all of the corresponding electrodes of a single pack be joined to the core at one location, with the electrodes of different packs attached to the core at angularly spaced locations. Alternatively, several corresponding electrodes of a single electrode pack can be affixed to the core with angular spacing. It is also possible, in a less preferred arrangement, to have the electrode packs generally cylindrically surround the core in a coaxial manner. In this connection it may be noted that one or more rings can be disposed coaxially with the housing with annular clearance from one another, the housing and the core so as to constitute respective cores for electrode packs wound around these rings.

Yet another feature of the present invention resides in the provision of one or more gas-recombining electrodes within a hermetically sealed seal of the character described. This auxiliary electrode can be disposed within the core which can be hollow and communicate with a gas-collecting space in the housing atop the electrode packs. In any event, it is preferred to provide the auxiliary electrode, which can also be disposed in this space above the packs, with a depending lead connecting it with a main electrode of the packs having light polarity. In order to ensure the presence of a three-phase interface along the surface of the hydrogen and/or oxygen recombining electrodes, a bibulous layer or separator is disposed along the auxiliary electrode surface and has a wick depending into electrolyte within the electrode chamber. The electrolyte is thus drawn into contact with the one or both auxiliary electrodes.

We have further found that, in the event the gas-recombining capability of the auxiliary electrodes are exceeded by the production of gas, it is highly desirable to provide a pressure-relief valve within the cell housing in axial alignment with the core and even disposed therein when possible. In addition, the core can serve to receive a cut-off switch or the like for disconnecting the electrode system from an external circuit in the event that excessive gassing occurs. To accommodate the possibility of electrode gassing and yet prevent deterioration of the interelectrode surfaces along the upper edges, we have found it advisable to provide the electrode of one or both polarities with a separator means which, unlike the upwardly open U-shaped separator packs previously employed, is a sleeve reinforced at at least its upper edge and provided therealong with a gas-collecting channel communicating with the interior of the sleeve and discharge gas at the open end thereof. This separator may be composed of a semipermeable synthetic resin with the channel being formed by spaced bonding of the two sides of the sleeve together. The presence of this channel improves the resistance of the edge portion of the separators to migration of ions and electrode deterioration. Sealing can be carried out thermally, ultrasonically, mechanically, or with the aid of adhesives, as desired. As a further reinforcement of the cell structure and the separator system, we have found it desirable to provide insulating means for sealing the core at its upper and lower extremities, thereby electrically isolating it from the housing shell. The separator system can also include separators which are upwardly and/or downwardly open and preferably extend beyond the electrode pack. Prior to activation of the cell, a potting compound can be introduced to seal off the separators at their base. Suitable potting compounds include hardenable or soft synthetic resins, e.g. epoxy, waxes, electrolyte activated gels or the like resistant to penetration by the active electrochemical materials. These systems, while most suitable with silver oxide/zinc electrode pairs, are also appropriate for silver/oxide cadmium, nickel oxide/zinc, nickel oxide/cadmium, lead acid, manganese dioxide/zinc and mercury oxide/zinc.

The above and other objects, features and advantages of the present invention will become more readily apparent from the following description, reference being made to the appended drawing in which:

FIG. 3 is a cross-section taken on the line III—III of FIG. 2;

FIG. 4 shows yet another cell incorporating our invention;

FIG. 5 is a cross-section through the embodiment of FIG. 4 taken on the line V—V thereof;

Figure 1:
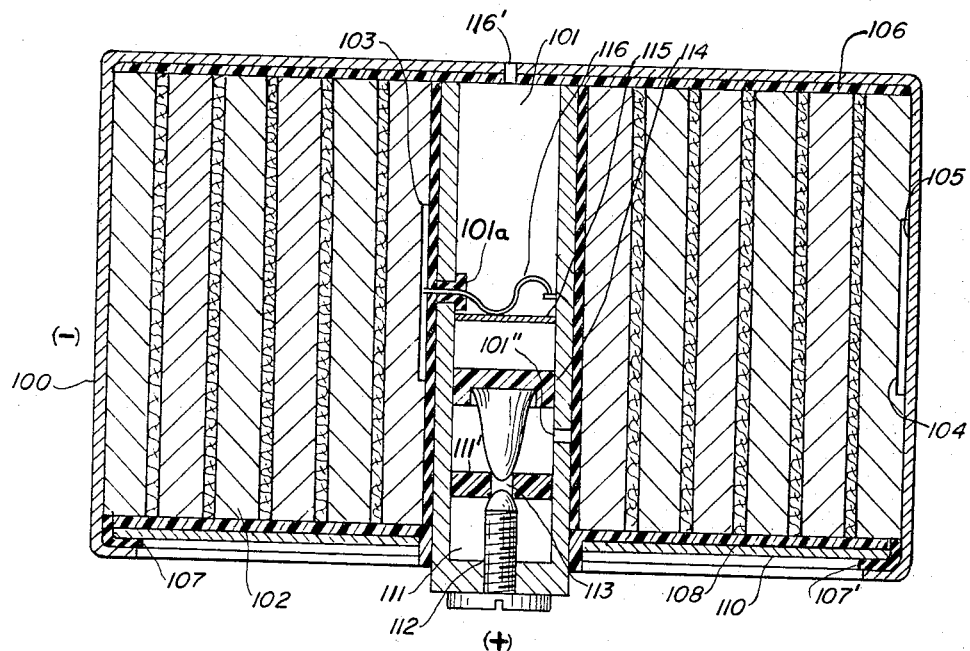
FIG. 1 is a cross-section through a spirally wound cell using our invention.

In FIG. 1 we show a conductive cup-shaped housing 100 containing a hollow core 101 whose interior communicates with the interior of housing 100 via at least one bore 101''. An electrode assembly or pack 102 is spirally wound about the core, its positive-electrode tabs 103 being connected thereto via the intermediary of an insulating sleeve 101a and a switch 116, while the negative tabs 104 are connected to the inner wall 105 of the housing 100. An insulating disk 106 electrically isolates the electrode pack from the housing at its top whereas gasket flanges 107, 107', integral with the insulating disk 108, prevent contact of the core 101 or housing 100 with a cover 110. An electrically nonconductive sheath can surround the sides of housing 100, exposing its base, if desired. A pressure-bleed valve 111, within the hollow core 101, provides for the relief of gas through the action of a screw 112 which selectively opens and closes a bleed channel 113 in valve body 111' to permit escape of gas as desired along the screw bore of valve body 111'. A pressure-activated cut-off switch 116 is located in the hollow core 101 and, upon build-up of gas pressure in core compartment 101 and prior to gas escape past the piston-like second valve 114 and the channel 113 cooperating therewith concurrently with upward deformation of the diaphragm 115, the switch 116 is actuated, thereby opening the charging circuit connected to it via the cell terminals and terminating the charge. Opening 116' maintains atmospheric pressure on the side of the diaphragm. Positive and negative terminals are constituted by the conductive core and the cell bottom of the housing. The electrode pack construction will be described in greater detail hereinafter although it may be noted that the electrodes, especially the negative electrodes can be particularly long and of limited height to reduce the effect of electrode shape change.

Figure 2:
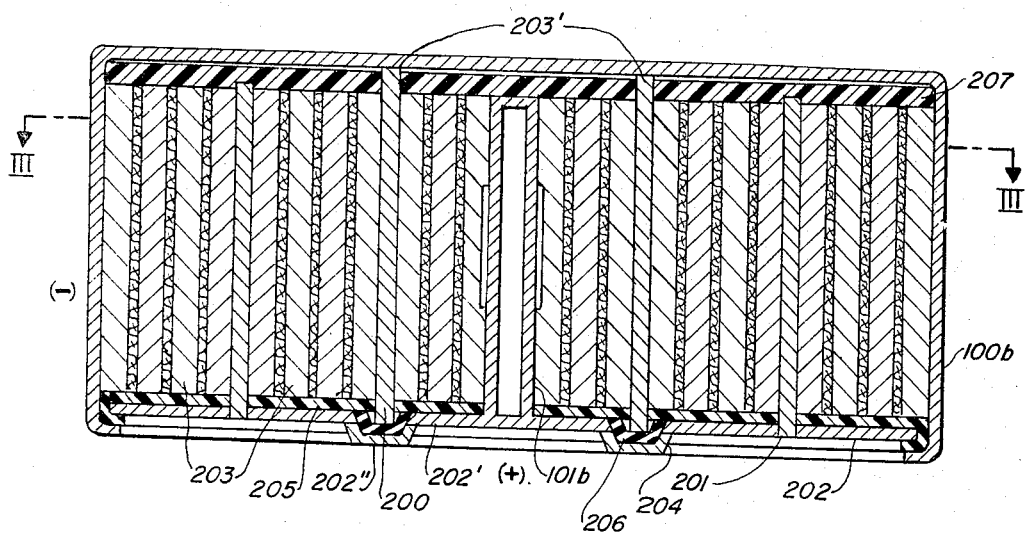
FIG. 2 is a modification of the embodiment shown in FIG. 1 in cross-section.

FIGS. 2 and 3 show a modified battery cell embodying our invention. The cup-shaped housing 100b contains a hollow core 101b. Disposed within the housing and concentrically surrounding the core 101b with annular clearance are two ellipsoidally cylindrical metallic rings 200 and 201; the ring 201 is electrically and mechanically connected to a conductive bottom plate 202 while ring 200 is joined to the housing 100b at 203'. Disposed within the three electrode chambers defined within the housing by the rings 200, 201, are electrode packs 203 whose major surfaces are parallel to the axis of the rings 200, 201 and which are spirally wound about the rings and the core, respectively. The positive tabs of the innermost electrode packs are electrically connected to the conductive core 101b as will be apparent hereinafter. In the case of those packs 203 disposed in the outer chambers, the positive tabs are connected to the conductive annular rings 201, the latter being interconnected with the core by way of the bottom plate 202 and the metallic legs 204 in contact therewith. Plates 202 and legs 204 are insulated from the housing by insulators 205 and 206, respectively. Negative tabs of the outermost electrode packs 203 are connected to the housing 100b while the corresponding tabs of the innermost packs are connected to the other annular ring 200. Ring 200 is electrically tied to the housing at 203, as previously indicated, and is insulated from the bottom plate 202, constituting the negative terminal of the cell together with plate 202' to which it is electrically connected via the clamping ring 202'', by the insulators 205, 206. Caps 207 overlie the electrode packs and insulate them from the housing, the latter constituting the negative terminal. Plate 202', to which the core 101b is affixed, can also be electrically insulated from plate 202, in which case the cell terminals 100, 202 and 200, 202' can be connected in series for increased cell voltage at reduced current. This construction is particularly suited for nickel oxide-cadmium, nickel oxide-zinc and other nickel-containing batteries, the nickel electrode tabs being bonded to the cell walls, core or rings by, for example, spot welding although tabs of large surface area can be held against the cell wall merely by the inherent pressure of the pack. In FIG. 3 this embodiment is shown in a top view to make clear the concentric disposition of the electrode packs 102 within the three electrode chambers created by the location of the annular rings 200 and 201 in the space between the inner wall of the housing and the core. The housing can be elliptically cylindrical as illustrated for maximum utilization of battery volume or circularly cylindrical for use in the conventional manner. The cut-off switch and/or pressure-release valve of FIG. 1 can also be employed in this embodiment.

FIGS. 4 and 5 show a construction in which the electrode packs 102 are wound directly about a solid conductive core 400 without the disposition in the housing of annular rings as disclosed in FIG. 2. The electrode pack is shown here in greater detail to illustrate clearly the position of the negative electrodes 401 and the positive electrodes 402. One or both of the latter can be encased in electrolyte-permeable separator sleeves 403 (to be described in detail with respect to FIGS. 10 and 11) which at their tops are reinforced and formed with integral channels 404, so that gas formed in the sleeves is conducted through these channels and out their open ends (not shown) into the free space 405 above the electrodes. Core 400 is insulated from the housing 400' by a plastic boot 406 at its bottom. At the top, where core 400 is integral with or affixed to a cover plate 407, the latter is insulated from the housing by a nonconductive synthetic resin sheet 408 which underlies the cover 407 and embraces the edges thereof with its upwardly and inwardly deformed periphery. A rubber ball 409, coated with silicone grease to prevent carbonization in an alkaline-electrolyte cell, is seated in a depression 410 in cover plate 407 while a spring cover 411 of any suitable resilient and electrically conductive material overlies cover plate 407 and is provided with a formation having a downwardly concave recess in its center, complementary to the rubber ball 409 and hugging it in an undeflected position of the plate. While the valve is illustrated to be centrally located with respect to the core, it should be noted that a sealed terminal head can be substituted for the valve if desired and the valve disclosed eccentrically in the plate. A pinhole vent is located in the top of the formation. Porous plugs 413 are provided in two or more registering holes in the synthetic-resin plate 408 and the conductive spring plate 407 so that gas generated in the cell may pass through the plugs and, after developing a predetermined pressure within the cell, can axially deflect the flexible spring cover 411 upwardly and escape around the ball 409 and through the vent 412. The electrodes are secured against movement by a potting compound 419, such as a hardenable resin (e.g. epoxy), wax or gel, poured around the bases of their separators below the lower edges of the electrodes during assembly of the cell, this potting or sealing compound also serving to reinforce the lower portions of the separator and closing them at their bases. When the electrodes include silver oxide or zinc as active materials, the potting compound should be resistant to penetration by dendritic zinc and dissolved silver oxide. In the latter case, cellulosic separators (e.g. cellophane) can be used although it should be noted that the "grain" of the separator should be transverse to the cell axis and in the direction of the major dimension of the electrode.

Since open cells, that is cells not hermetically sealed, generally lose a considerable proportion of their electrolyte in the course of their lifetime, a condition which may result in the need for servicing of the cell, we prefer to seal all of the units described herein hermetically. This is accomplished in the embodiment described above, the valve incorporated therein being intended as a safety factor only since during normal operation of the cell we provide means for recombination or adsorption of the gas which is produced during high rates of charge or discharge or charging in excess of electrode capacity. Accordingly we dispose an auxiliary electrode 415 below the plate 408 and in the free space 405. An electrolyte-adsorbent separator 416 is secured underneath the auxiliary electrode and a wick (or an integral portion of the separator) 417 depends therefrom into the electrode pack to supply the separator 416 with electrolyte through capillary action. Electrical contact between the auxiliary electrode 415 and the main negative electrodes 401 is provided by a pigtail lead 418. The auxiliary electrode can thus recombine with oxygen both by chemical and electrochemical means, that is, through the finely divided electronegative material used in it, such as alkali-wetted zinc or cadmium, and electrochemically through the electrolytic bridge of the wick 416. Advantageously, the oxygen recombining electrode incorporates finely divided zinc or cadmium powder in a conducting grid of copper or silver for the former, and nickel or silver for the latter. Preferably the oxygen recombining electrode comprises cadmium as an active material carried by an amalgamated silver or copper grid, the electrode being wetproofed by treatment with a polytetrafluor ethylene or polyethylene emulsion. It will be appreciated that the cell may additionally be provided with a hydrogen recombining electrode which must be separated from the oxygen auxiliary and will advantageously consist of sintered silver or nickel powder in silver or nickel grids. A platinum or palladium catalyzed surface is desirable, but not absolutely essential.

Figure 6:
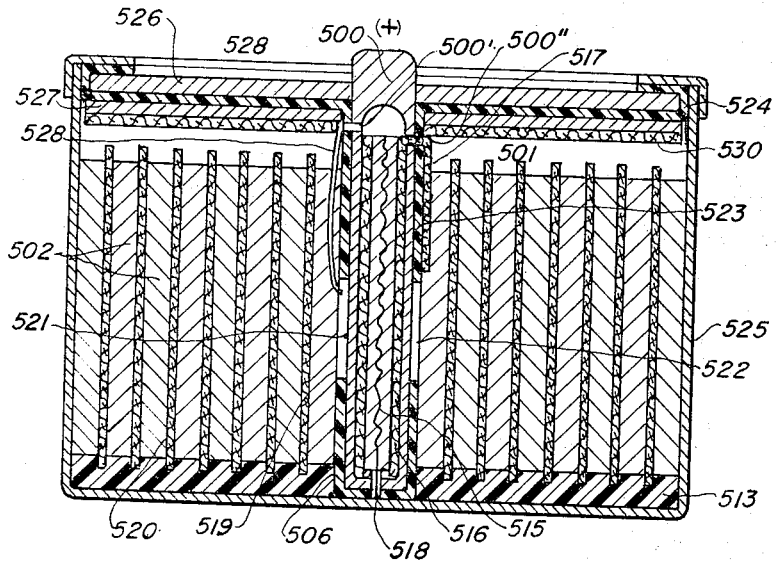
FIG. 6 represents a modification of FIG.4.

In FIG. 6 we show a modification of the system of FIGS. 4 and 5. The core 500 here is hollow and communicates with the electrolyte chamber via bores 500' and 500'' while the oxygen recombining electrode 515 is disposed therewithin along the axis of the core.

The bibulous separator 516, maintaining a three-phase interface at this electrode, is also located within the core and in fact surrounds the electrode 515; the wick 517 of this separator extends through the port 500'' into the electrode-pack chamber from where it draws the electrolyte necessary for proper functioning of the recombination process. The bibulous separator may be composed of Pellon, porous polyethylene or nylon felt, for example.

A lead 518 from the auxiliary electrode 515 extends through the insulating boot 506 of the core and is secured to the negative housing 525. Potting material 513 surrounds the lower edges of the electrode pack 502. At 520 are shown the separators disposed between the electrodes of the electrode pack. The separators are open at their top and bottom to facilitate the spirality of the electrode assembly during production of the cell.

The positive electrodes of the pack 502 have their tabs 519 secured to the core 500 at 521, 522, the core being insulated from the cell packs by a sleeve 523 along which the wick 517 extends. Sleeve 523 can be integral with the flanged gasket 524 which insulates the negative cell casing 525 from the positive plate 526 integral with the core. A hydrogen recombining electrode 527 can underlie the gasket 524 and be supported thereby while its insulated lead 528 is disposed spacedly opposite lead 518 to minimize the possibility of shorting between the positive and negative auxiliary electrodes. Lead 528 terminates at tab 521 via which it is connected with the positive electrodes. The bibulous separator layer 530 in contact with hydrogen recombining electrode 527 receives electrolyte from the wick 517 in contact therewith.

Figure 7:
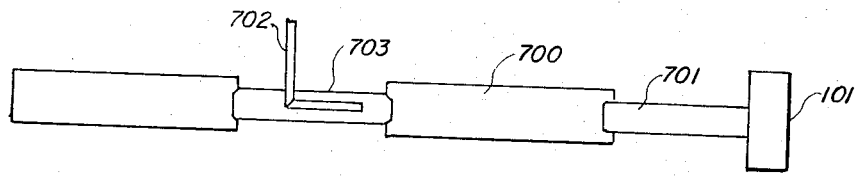
FIG. 7 is a perspective view of an electrode embodying our invention.

FIG. 7 shows an embodiment of an improved electrode, according to the invention, adapted to be incorporated into a pack. The foil-like strip 700 is provided with a tab 701 for purposes of connecting the electrode to a terminal. In the example shown in this figure the electrode is positive and the tab 701 is connected to the core 101 of, for example, FIG. 1. An intra-cell connector is provided by punching a narrow strip 702 from an intermediate portion 703 of the electrode body, leaving it attached to the electrode at one end and using the free end for purposes of connection. The electrode may be composed of an expanded-metal grid in the interstices of which an active material is bonded. The positive electrode foil, consisting in the case of silver-zinc cells of silver powder sintered to a silver grid, has a thickness of about 10 mils while the negative electrode (zinc oxide powder pasted into a grid) has a thickness of about 25 mils. The separator layers intermediate the electrodes may have a thickness of 20 mils and can consist of paper, nylon fabric or other macro-permeable layers on one or both sides of one or more semipermeable (e.g. cellulosic and/or polyvinyl-alcohol) layers.

Figure 8:
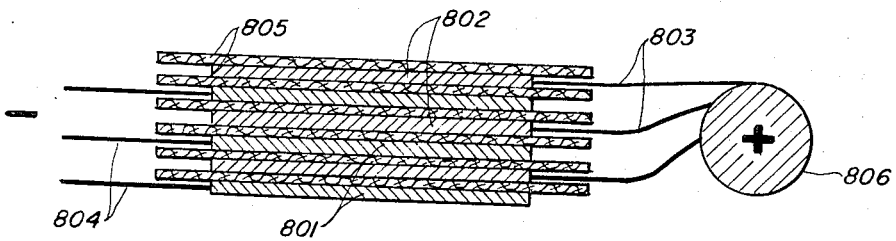
FIG. 8 shows an electrode pack in detail.
Figure 9:
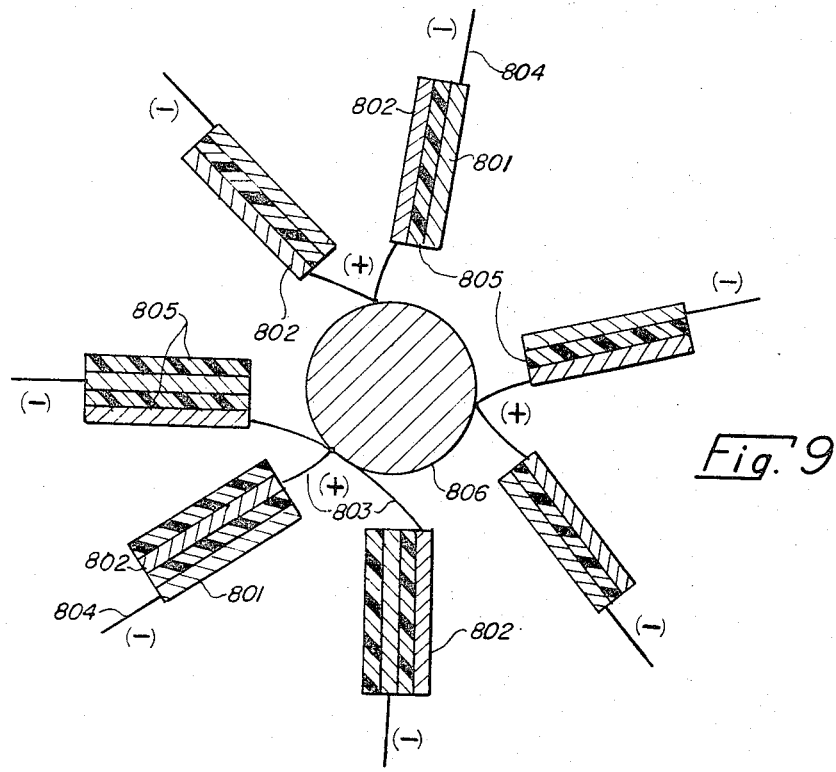
FIG. 9 shows radical connection of electrode packs about a cell core.

FIGS. 8 and 9 are detail views of electrode packs and of two systems of connecting such packs to the core; either method can be used in the cells of FIGS. 1, 2, 4 and 6. In the pack shown in FIG. 8, positive electrodes 802, having positive leads or tabs 803, alternate with negative electrodes 801 provided with negative leads 804. The foil-like electrodes, which are parallel to one another and have confronting major surfaces, are spaced apart by ionically permeable separators 805 which can consist of one or more layers of macropermeable material providing mechanical support as well as one or more layers of semipermeable material. A core 806 is shown to which the positive leads 803 are tangentially connected at angularly spaced locations. FIG. 9 shows another method of connecting the positive electrodes of the pack to the core. It should be noted that the leads of neighboring positive electrodes are in this case connected to the same location on the core instead of to locations spaced thereabout. While the separators of the packs can have the usual U-wrap configuration, it is preferred to dispose one or both types of electrodes in a sleeve-like separator.

Figure 10:
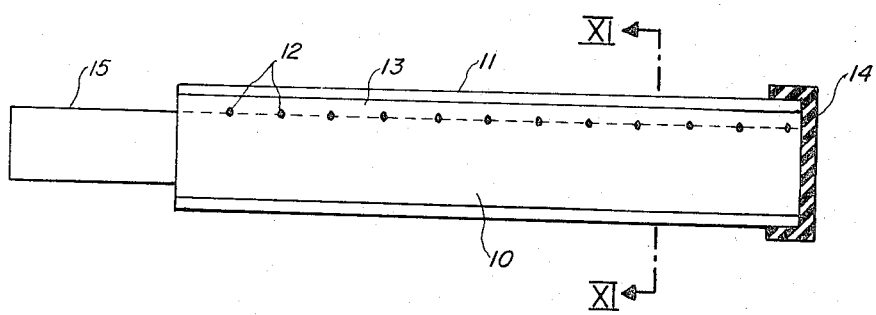
FIG. 10 is an elevational view of an improved electrode separator.
Figure 11:
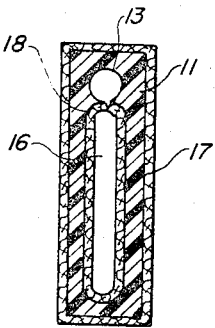
FIG. 11 is a cross-sectional view through the embodiment of FIG. 10 on the line XI—XI thereof.

In FIGS. 10 and 11, we show the improved separator already briefly mentioned in the description of FIG. 4. A sleeve 10, composed of an ionically permeable and electrochemically inactive material such as polyvinyl alcohol (PVA) is provided with a reinforced upper edge 11, e.g. by continuous heat sealing of a folded PVA strip along this edge. Along a marginal area below the edge 11, there is provided a number of longitudinally spaced seals (e.g. spotwelds) 12 so that a channel 13 is defined along the edge 11, this channel communicating with the electrode pocket at all points between the seals 12 and with the electrolyte chamber of the cell at an open end of the channel. A boot 14 of a suitable insulating material (e.g. rubber) closes off one end of the sleeve. The electrode is received within the sleeve 10 so that only its connecting tab 15 remains uncovered. Since the sleeve is relatively thin (e.g. on the order of 20 mils thickness) and highly flexible it will be understood that it will not interfere with the spiral winding of the electrode pack about the core during assembly of a battery cell. The construction of the sleeve is shown in more detail in FIG. 11 where the electrode pocket 16 (electrode not shown) is seen to be provided with a polyamide-fabric (e.g. nylon) layer 18. The outside of the sleeve 10 is surrounded by a similar layer 17. Both layers serve to provide mechanical support to the semipermeable sleeve.

Although the various embodiments as shown have been described in some detail herein, the disclosure concerning them is not to be considered limiting. In fact, the invention is believed to admit of a variety of modifications readily apparent to persons having ordinary skill in the art. All such modifications are deemed to be within the scope of this disclosure as defined in the appended claims.

We claim:
1. A rechargeable electrochemical battery cell comprising a housing with a closed inner peripheral wall; electrically conductive core means disposed within and communicating with said housing and spaced therefrom; insulating means interposed between said core means and said housing for electrically isolating said core means from said housing; at least one foil like positive electrode strip disposed between said core and said housing with its major surface substantially parallel to said core; at least one electrolyte absorbable ionically permeable separator means at least coextensive in length with said positive electrode with its major surface substantially parallel to the major surface of said positive electrode, and disposed on the side thereof toward said housing; at least one foil like soluble negative electrode strip substantially coextensive in length with said positive electrode, with its major surface substantially parallel to the major surface of said separator and said positive electrode, and disposed on the side thereof toward said housing; wherein said electrodes and said separator substantially fill the annular space between said core and said housing; said core means being the terminal for said positive electrode; said housing being the terminal for said negative electrode; and said cell is filled with electrolyte, the said electrodes being so dimensioned that the edge to surface ratio is small.

2. A rechargeable electrochemical battery cell as claimed in claim 1 wherein said positive electrode, said separator and said negative electrode constitute a juxtajosed assembly which is spirally wound about said core.

3. A rechargeable electrochemical battery cell as claimed in claim 1 wherein said positive electrode comprises silver and said negative electrode comprises zinc.

4. A rechargeable electrochemical battery cell as claimed in claim 1 wherein said core and said housing are each substantially cylindrical, wherein said core is hollow and wherein said core and said housing are substantially concentric.

5. A rechargeable electrochemical battery cell as claimed in claim 1 containing a gas pressure release valve.

References Cited
UNITED STATES PATENTS

| | | | |
|---|---|---|---|
| 1,196,225 | 8/1916 | Foos | 136—107 |
| 3,114,659 | 12/1963 | Warren | 136—6 X |
| 3,156,585 | 11/1964 | Yamano et al. | 136—14 X |
| 3,216,859 | 11/1965 | Duncan | 136—6 |

ALLEN B. CURTIS, *Primary Examiner.*

WINSTON A. DOUGLAS, *Examiner.*

A. SKAPARS, B. J. OHLENDORF,
*Assistant Examiners.*